United States Patent [19]

Queiser

[11] 4,157,248

[45] Jun. 5, 1979

[54] METHOD FOR TREATING GASEOUS NUCLIDES AND GAS SYSTEM FOR VENTILATING TANKS CONTAINING RADIOACTIVE LIQUID

[75] Inventor: Horst Queiser, Maintal, Fed. Rep. of Germany

[73] Assignee: Kraftwerk Union Aktiengesellschaft, Mülheim (Ruhr), Fed. Rep. of Germany

[21] Appl. No.: 768,499

[22] Filed: Feb. 14, 1977

[30] Foreign Application Priority Data

Feb. 27, 1976 [DE] Fed. Rep. of Germany ....... 2608162

[51] Int. Cl.[2] ............................................. B01D 53/00

[52] U.S. Cl. .................................... 55/66; 55/385 C; 55/97; 137/589; 137/571; 137/266; 220/855; 220/85 VR; 220/88 B

[58] Field of Search .................. 55/39, 40, 59, 60, 46, 55/66, 97, 385 C; 137/577, 587, 589, 266; 60/657, 644; 138/26, 30; 220/85 VS, 85 VR, 85 S, 88 B

[56] References Cited

U.S. PATENT DOCUMENTS

| | | | |
|---|---|---|---|
| 10,284 | 2/1883 | Pfaudler | 137/266 |
| 1,508,048 | 9/1924 | Buck | 270/85 VS |
| 2,141,356 | 12/1938 | Koerver | 137/206 |
| 3,871,842 | 3/1975 | Queiser et al. | 55/66 |
| 3,944,466 | 3/1976 | Marchese | 55/66 |

FOREIGN PATENT DOCUMENTS 2338044 2/1975 Fed. Rep. of Germany.

OTHER PUBLICATIONS

Thiemig Taschenbeucher vol. 51, pp. 180–183, dtd. 2/74.

*Primary Examiner*—Bernard Nozick
*Attorney, Agent, or Firm*—Herbert L. Lerner

[57] ABSTRACT

Treating and venting gaseous nuclides in the gas space above the liquid level in tanks containing radioactive liquid is accomplished by connecting the gas spaces in series with the gas space at one end having the highest radioactivity, normally discharging at a limited rate into a waste gas system, and air to replace the discharged gas, introduced into the gas space at the other end. Sudden surges or fluctuations in gas pressure in the gas spaces due to rapid filling of the tank with liquid is relieved by discharging gas from the gas space of low activity at the other end into a stack. Voids in the tanks created by rapid emptying of the tanks is filled by air entering the gas space of low activity at the other end. A self cleaning filter which removes nuclides from the gas before entering the stack is reactivated by the passage of air in a reverse direction through the filter with the return of the nuclides to the gas space of low activity. The system permits longer holding time of nuclides, greater assurance of unwanted nuclides not entering the stack, and means for compensating for surges in the gas space without disturbing the operation of the waste gas system.

14 Claims, 2 Drawing Figures

METHOD FOR TREATING GASEOUS NUCLIDES AND GAS SYSTEM FOR VENTILATING TANKS CONTAINING RADIOACTIVE LIQUID

BACKGROUND OF THE INVENTION

1. Field of the Invention

This invention relates to gaseous nuclides in storage tanks and more particularly refers to a new and improved method for treating nuclides and a gas system for ventilating tanks containing radioactive liquid.

2. Description of the Prior Art

In nuclear power plants there are produced various liquids having different degrees of radioactivity, which liquids must be contained in tanks for longer or shorter periods of time. Examples of such liquids are primary water from the reactor pressure vessel, water used for cooling, steam condensate and waste liquids. It was known to vent such tanks, for example, in Vol. 51 of the series "Thiemig Taschenbuecher", pages 180 to 183, a waste gas system of a pressurized-water reactor is described, in which, in addition to connections from a primary water storage tank, connections from other systems leads to a waste gas line, which connect ultimately to a vent stack.

Such ventilated tanks are also found in boiling-water reactors, as shown in the German Published Non-Prosecuted Application No. 23 38 044. Hence, the connection to a stack is preceded by a storage tank, so that volume fluctuactions which occur in operation for brief periods, can be equalized and the emission of activity of the environment reduced somewhat thereby.

SUMMARY OF THE INVENTION

An object of the present invention is to provide a system for venting tanks containing radioactive liquid with the emission of additional large storage volumes.

Another object of the invention is to provide a system for venting tanks containing radioactive liquid in which rapid fluctuations are compensated without the discharge of gas of high radioactivity.

With the foregoing and other objects in view, there is provided in accordance with the invention a method for treating and venting gaseous nuclides in the gas space above the liquid level in tanks, which includes connecting the gas spaces of the tanks to provide a chain of tanks with the gas space in the tank at one end of the chain in communication with the gas space in the tank at the other end of the chain through the intermediate gas spaces in the other tanks in the chain, normally discharging limited amounts of gas from the gas spaces at the first end of the chain into a waste gas system, discharging excesss gas in the gas spaces resulting from filling a tank with liquid, from the gas space at the other end of the chain, and when liquid is drained from a tank thereby creating a void, introducing inert gas into the gas space at the other end of the chain to fill the void.

In accordance with a preferred method of the invention discharged excess gas resulting from filling a tank with liquid, is passed through a filter to remove nuclides contained in the discharged excess gas, and wherein the inert gas is, prior to being introduced into the gas space at the other end of the chain, passed through the filter in a flow direction the reverse of the discharged excess gas to thereby entrain the nuclides in the filter and carry the nuclides back into the gas space.

In a further feature of the invention the quantity of inert gas introduced into the gas space at the other end of the chain, integrated over a time period of a week, is maintained larger than the quantity of gas discharged from the gas space at the other end of the chain.

There is provided in accordance with the invention, a gas system for ventilating tanks containing radioactive liquid including a plurality of tanks containing liquid and having a gas space above the liquid, conduit means connecting the gas spaces of the tanks in series with the tanks arranged according to their radioactivity with a tank of high radioactivity at one end and a tank of low radioactivity at the other end, a waste gas system, connecting means for conducting gas from the gas space of the tank of high radioactivity to the waste gas system, a stack, and stack connecting means for conducting gas from the gas space of the tank of low radioactivity to the stack.

BRIEF DESCRIPTION OF THE DRAWINGS

Other features which are considered as characteristic for the invention are set forth in the appended claims.

Although the invention is illustrated and described as embodied in a method for treating gaseous nuclides and gas system for ventilating tanks containing radioactive liquid, it is nevertheless not intended to be limited to the details shown, since various modifications may be made therein without departing from the spirit of the invention and within the scope and range of equivalents of the claims.

Figure 1:
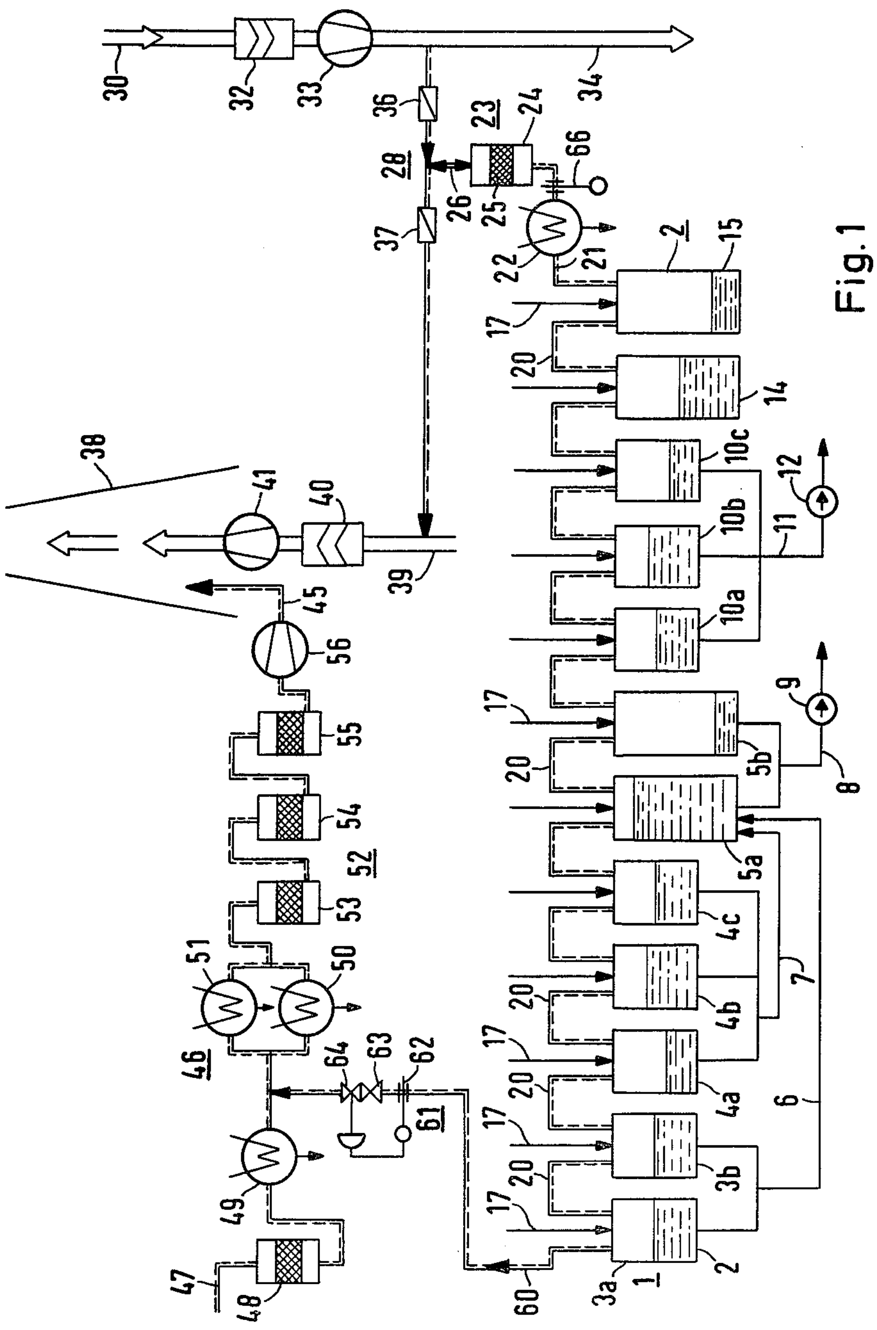
Figure 2:
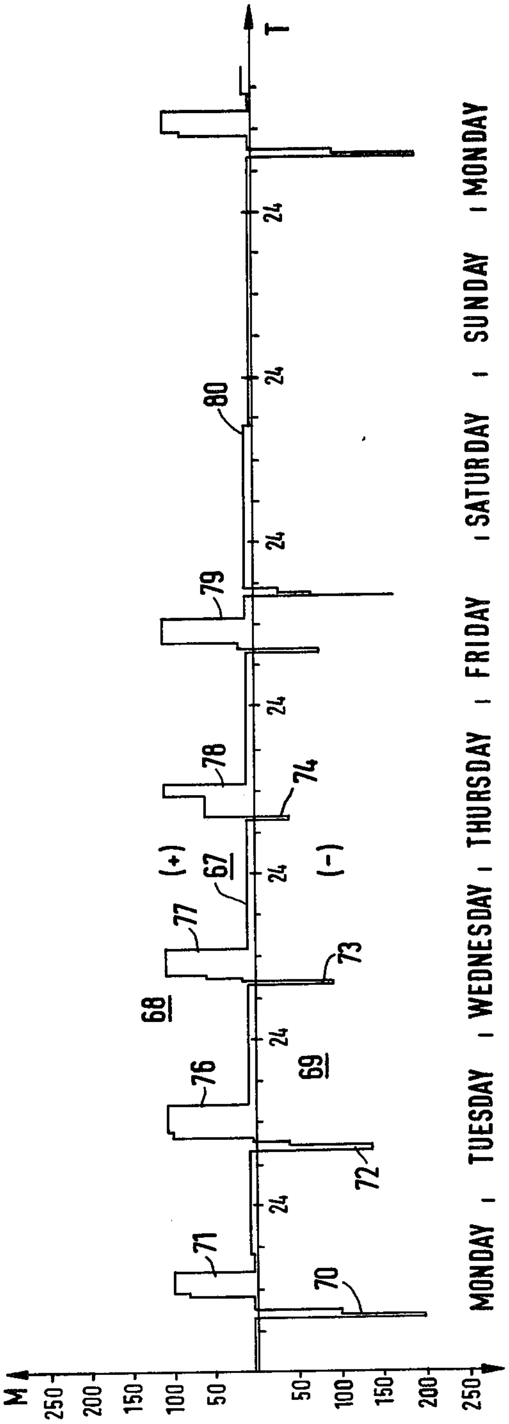

The invention, however, together with additional objects and advantages thereof will be best understood from the following description when read in connection with the accompanying drawings, in which:

FIG. 1 diagrammatically illustrates a tank system associated with a boiling-water power reactor, with provision for ventilating the tanks in accordance with the present invention; and FIG. 2 diagrammatically illustrates the movement of air for ventilating the tanks by plotting quantities of air versus time in a period covering at least one week.

DETAILED DESCRIPTION OF THE INVENTION

A primary objective is to keep the emission of radioactivity into the environment low. Pretreatment of the gas to remove nuclides in a waste gas system may be employed. Such systems will satisfactorily handle the normal emission of gas, but are unsatisfactory for handling emissions resulting from sudden fluctuations, unless extra large systems at great cost are employed. Large storage tanks have been suggested for holding back the gas for a time long enough to permit the activity of the gas to decay to a large degree, but here again large increased costs are involved and in addition such large tanks present an additional hazard. In the present invention, the waste gas system may be operated throughout at substantially normal capacity despite sudden or rapid fluctuations in gas volume. With the arrangement of gas spaces of the tanks in accordance with the invention, large storage tanks are not required.

In a method according to the invention for treating gaseous nuclides from tanks with different liquid levels, a limited quantity of exhaust air is continuously drawn from the air spaces of the tanks. Further quantities of excess air which occur for brief periods of time when the tanks are filled up with liquid are led to a stack. The tanks which are connected to form a chain act as a delay system. Thus, when the liquid content is emptied out of the tanks, the ventilation takes place from that end of the chain of tanks which is opposite the connection to the waste gas system. The method is preferably carried out so that a filter is used as a reversibly operating storage device for removing the nuclides discharged from the tanks with the exhaust air in the direction toward the stack. The nuclides are held back from the air leaving the chain of tanks and are later released from the storage device into the air flowing back into the chain of tanks.

The movements of the quantities of liquid are largely predetermined by the operating program of the nuclear power station. However, it has been found that practically always arrangements can be made so that the quantity of air drawn into the chain of tanks, through the continuous discharge of air into the waste gas system, is kept larger, as integrated over the time, than the quantities of motive air given off in the direction toward the stack.

The gas system particularly well suited for treating gaseous nuclides has the gas spaces of the tank connected with the tanks lined to form a chain arranged in accordance with the degree of radioactivity of the gas in each tank. The high-activity end of this chain or series of tanks is connected to a waste gas system and the low-activity chain leads to the stack.

The gas volumes which are present in the tanks above the liquid level, are used as storage chambers which cause a delay of the gases before they leave for the stack, and thereby make possible a decay of the radioactivity. By virtue of the order of the tanks in accordance with the degree of radioactivity of the respective gas present, it is ensured that highly active gases take the longest time before they are discharged into the stack. At the same time, the connection of the high-activity end of the chain to a waste gas system which is equipped with filters for radioactive gases and, in particular, rare gases, ensures substantially continuous purging. The discharge of gases into the waste gas system influences the balance of the amount of air entering the gas spaces at the tank of low activity in the chain. Because the discharge of gases from the high activity end of the chain does not exceed limited amounts even during fluctuations, there is no overloading of the waste gas system with contamination of the environment.

It is advantageous to arrange a filter which can absorb long-life activity carriers, particularly rare gases, at the stack-side end of the chain. The filter, which provides for practically "zero emission" from the area of the ventilated tanks into the stack, may be designed as an absorption filter, for instance, in the form of finely granulated activated carbon. Such a filter may be located in a storage tank or may be combined with one. This device, called a filter, is suitable for holding back long-life activity carriers, i.e. storage of rare gas.

A purge gas line connected a the stack-side end of the chain makes it possible to provide a slow flow, with, for instance, a quantity of 10 $m^3$ gas per hour. This purge gas flows through the gas spaces of the tanks connected to form a chain, in the direction from the stack toward the waste gas system. Not only is the overall activity level kept low through such purging, but also because of the direction of flow of the purge gas, any gas leaving the stack side has the lowest activity. Purified and dried waste gas that comes from the waste gas system can be used, for instance as purge gas. However, fresh air, which likewise may be dried, can also be used for this purpose.

A particularly advantageous embodiment of the invention is obtained by connecting the purge gas line to the chain between the above-mentioned filter and the stack. In this manner, the purge gas cleans the filter as a part of the normal operation, of radioactive components which had been stored in previous operating phases when gas leaves the chain for the stack. These radioactive products are then returned by the purge gas through the gas spaces of the tanks to the waste gas system. Air, which is drawn into the chain of tanks when one or several tanks are emptied, can act in the same sense as the purge gas.

The purge gas may be fed to the chain via drying apparatus, in order to prevent moisture from being carried into the tanks of the chain. In this regard, it is advantageous to design the drying apparatus as a cooling trap, which is structurally combined with a cooling device for the filter. Particularly high absorption rates can be achieved for a given volume with filters cooled in this manner.

The connections of the tanks lined up to form a chain are located advantageously on opposite sides of the gas space above the liquid, or are spaced a distance of at least the radius of the tank. Thereby substantially the entire volume of the gas space in the tanks acts as a delay tank for the flow of the gases with decay of radioactivity. The connections to the tanks are preferably mounted on the top side of the tanks or at a point close to the top, so that the highest conceivable liquid level will not block off the flow of gas between gas spaces in connecting tanks.

The pressure in the chain of tanks may be below atmospheric pressure to avoid an escape of radioactive gases at leakage points. The chain of tanks are frequently connected to a part of the waste gas system which is also below atmospheric pressure. A pressure reduction device may further be provided here in order to bridge the pressure difference between the waste gas system and the chain of tanks. It is intended thereby to ensure that the pressure in the chain is higher than that in the waste gas system, so that the generally higher radioactivity of the waste gas system cannot be dragged into the chain of tanks.

Referring to FIG. 1 which shows the tank system associated with a boiling-water power reactor of 1000 MWe, numeral 1 designates generally a chain of twelve tanks 2, which are provided for radioactive liquids of a nuclear power station. The metal tanks **3*a* and 3*b* contain, for example, 40 $m^3$ of primary water each, which comes from the reactor pressure vessel. This liquid has the largest activity. It is 5 Ci (Curie International) each. Following this, there are three metal tanks 4*a*, 4*b* and 4*c* of equal volume, which serve as coolant tanks. The activity is somewhat weaker here; it is 1 Ci each. Two further, parallel-connected tanks 5*a* and 5*b*** with a larger volume of 200 $m^3$ each are provided to receive 150 $m^3$ of liquid. This liquid is steam condensate, i.e. reactor coolant condensed behind the turbine of the boiling-water reactor and has an activity lower by a factor of 10 or more than the primary water in the reactor pressure vessel.

A connecting line 6, which serves for transferring liquid and is connected at the bottom of the tank, is provided between the tank **5*a* and the tanks 3*a* and 3*b*. A similar connecting line 7 allows the coolant from the tanks 4 to be transferred into the tank 5*a*. The tanks 5*a* and 5*b* are further equipped via a line 8 with a pump 9**, by means of which liquid can be pumped into a liquid waste treatment system.

Three further, parallel-connected tanks 10a, 10b and 10c are provided for storing liquid waste, for example, leakage water from the sump of the reactor building. They are likewise connected to a liquid waste treatment system via a line 11 with a pump 12. The average activity here is 0.2 Ci. Another tank 14 of 200 $m^3$ contains 150 $m^3$ of liquid. The radioactivity, with 0.1 Ci each, is very low here. This is true also for the last tank 15 in the train of the chain 1, which tank contains waste water.

If necessary, nitrogen can be admitted to the tanks 2 to 15 via air supply lines 17, which are parallel to each other. Provision is made by means of valves that nitrogen only may be fed-in via the lines 17. The lines 17 and the nitrogen storage tank, not shown, therefore remain practically free of activity.

Ventilation-wise, the tanks 2 to 15 are connected in series in the train of the chain 1 by connecting lines 20. The "low-activity" end 21 of the chain 1 leads via a cooler 22 to a rare-gas accumulator 23, which consists of a tank 24 with an activated-carbon absorber 25. The end of the accumulator 23 away from the chain 1 is connected via a line 26 to an air system designated generally by numeral 28. Part of this is an air supply line 30, which leads to a compressor 33 via a filter 32. The compressor supplies the areas to be ventilated of the nuclear power plant, not further shown, with fresh air via a pressure line 34; an underpressure, i.e. pressure below atmospheric, of, say, −10 mm water column being maintained.

The line 26 is connected via a swing check valve 36 to the pressure line 34 of the compressor 33. Another swing check valve 37 establishes the connection to an exhaust air stack 38. The latter takes in an exhaust air through line 39, which carries building exhaust air and is led via a filter 40 to stack 38. An underpressure of −10 mm water column is maintained in the line 39 by means of a blower 41.

An outlet line 45, which comes from the waste gas system designated generally by the numeral 46 terminates into the stack 38. The part of the waste gas system shown in FIG. 1 includes a line 47, which comes from the turbine condenser, not shown, of the boiling-water reactor. The latter is connected via the line 47 to conventional recombination equipment 48, in which radiolysis gas, i.e. hydrogen and oxygen resulting from the dissociation of water by radiation, that may be contained in the steam, is burned; the combustion may be a catalytic process without flame formation. The waste gas influenced in this manner is led via a condenser 49 at a pressure of −500 mm water column to two further, parallel-connected coolers 50 and 51. In these coolers, the waste gas is dried. Waste gas systems are known and used in the art.

Behind the coolers 50 and 51 of the waste gas system 46 follows a delay section 52 with three series-connected tanks 53, 54 and 55, which serve to hold back gases, particularly, rare gases. From the delay section 52, the gases are then transported by a blower 56 into the line 45, which leads into the stack 38.

The chain 1 of the tanks 2 joined together in accordance with the invention is connected at its high-activity end 60 to the waste gas system 46. A pressure-reducing device 61 is provided here in the connecting line. It consists of a measuring orifice 62 and a valve 63 which is controlled by the latter and by which the amount of purge air through the tank system is controlled (e.g. about 10 $m^3/hr$). There is a pressure difference of −10 mm water column in the area of the coolant tanks and −500 mm water column in the waste gas system 46. A further valve 64 is normally open. It merely serves to separate the gas system for ventilating the tanks 2. In FIG. 2, the ventilation balance is shown diagrammatically, which is obtained from the flow directions and the amounts of moved air in the vicinity of the line 26. The measuring point 66 is located, as shown in FIG. 1, between the cooler 22 and the rare gas accumulator 23. The quantities of moved air M are plotted on the ordinate in $m^3/hr$. On the abscissa as the time axis, the time T of a week is plotted.

The curve 67, which characterizes the air movement, intersects the zero line many times. It is seen, however, that the area portions 68 which are situated above the abiscissa axis and are characteristic of the quantities of air drawn into the system, are several times larger, seen integrally, than the area portions 69 situated below the abscissa axis, which indicate the quantities of air led into the stack. For the drawn-in air, a purge air quantity of about 5 to 10 $m^3/h$ is characteristic. This amount of air drawn-in practically continuously is superimposed in the diagram at 70 by an amount of air which is pushed into the stack by the fast filling of a tank of the chain. The quantity of air pushed out then is substantially smaller, however, than the quantity of air drawn-in at 71, which comes about by the draining of one of the tanks. A similar situation is also obtained in the following filling operations which are indicated in the curve diagram by the curve portions 72, 73, 74. The air pushed out is substantially less than the quantities of air which are drawn-in according to the curve portions 76, 77, 78 and 79.

It should further be noted that the drawing-in operations which are large as to quantity, and the appreciable discharges of air occurring when the tanks are filled, are missing in the region of the curve portion 80, as in this portion of the curve, indicating the time of a weekend, the filling operations which are largely controlled manually, are omitted.

The curve of FIG. 2 shows clearly that with the invention, no radioactive gases are given off to the environment, as the activity carriers which are held back in the rare gas accumulator 23 during the brief pushing-out operations, are transported in the opposite direction in the subsequent purge operations. These activity carriers can therefore decay in the tank system itself or, however, get into the waste gas system, which is adapted for the treatment of gaseous activities.

There are claimed:

1. Method for treating and venting gaseous nuclides in the gas space above the liquid level in tanks under normal liquid level conditions and under rapid fluctuations in liquid level resulting from filling or draining a tank, which comprises (a) connecting the gas spaces of the tanks to provide a chain of tanks with the gas space in the tank at one end of the chain in communication with the gas space in the tank at the other end of the chain through the intermediate gas spaces in the other tanks in the chain, (b) normally discharging limited amounts of gas from said gas spaces at said first end of the chain into a waste gas system and stack, (c) discharging gas in said gas spaces which exceed said normally limited amounts of gas as a result of filling a tank with liquid, from said gas space at said other end of the chain to a stack, and (d) when liquid is drained from a tank thereby creating a void, introducing inert gas into said gas space at said other end of the chain to fill said void.

2. Method according to claim 1 wherein said inert gas is gas from said waste gas system.

3. Method according to claim 1, wherein said discharged gas resulting from filling a tank with liquid, is passed through a filter to remove nuclides contained in said discharged gas, and wherein said inert gas is, prior to being introduced into said gas space at the other end of the chain, passed through said filter in a flow direction the reverse of said discharged gas, to thereby entrain said nuclides in the filter and carry the nuclides back into said gas space.

4. Method according to claim 1, wherein inert gas is introduced into said gas space at said other end of the chain to replace said limited amounts of gas normally continuously discharged from said gas space at said first end of the chain.

5. Method according to claim 1, wherein the quantity of inert gas introduced into said gas space at said other end of the chain, integrated over a time period of a week, is maintained larger than the quantity of gas discharged from said gas space at said other end of the chain.

6. Method according to claim 1, wherein a pressure below atmospheric is maintained in said gas spaces in the tanks.

7. Method according to claim 1, wherein said tanks in said chain are arranged in accordance with the degree of radioactivity in each tank with the gas space of the tank of high activity at said first end of the chain and connected to said waste gas system, and the gas space of the tank of low activity at said other end of the chain.

8. Method according to claim 1, wherein said inert gas is air.

9. Method according to claim 8, wherein said air is dried prior to introduction into said gas space.

10. Gas system for ventilating tanks containing radioactive liquid comprising a plurality of tanks containing liquid and having a gas space above the liquid, conduit means connecting the gas spaces of the tanks in series with the tanks arranged according to their radioactivity with a tank of high radioactivity at one end and a tank of low radioactivity at the other end, a waste gas system, connecting means for conducting gas from the gas space of said tank of high radioactivity to said waste gas system, a stack, stack connecting means for conducting gas from the gas space of said tank of low radioactivity to said stack, a filter disposed in the path of the gas from the gas space of the tank of low reactivity prior to the gas entering said stack to remove nuclides contained in said gas, a source of inert gas, and inert gas connecting means connected to the gas space of the tank of low activity for conducting inert gas into said gas space.

11. Gas system according to claim 10, wherein the conduit means connecting the gas spaces of the tanks in series have their openings to the gas spaces at the tops of the tanks, and wherein the two conduits in a tank each leading to the gas space of another tank are separated by a distance at least equal to the radius of the tank.

12. Gas system according to claim 10, including pressure reducing means interposed in said connecting means for conducting gas from the gas space of the tank of high radioactivity to the waste gas system.

13. Gas system according to claim 10, including a source of inert gas, and inert gas filter connecting means connected to said filter to provide reverse flow therethrough and entrain nuclides in the filter.

14. Gas system according to claim 13, including a cooler trap downstream of said filter to cool and dry said inert gas.

* * * * *